United States Patent
Tsuruta

(10) Patent No.: US 8,280,154 B2
(45) Date of Patent: Oct. 2, 2012

(54) COLOR PROCESSING APPARATUS AND METHOD THEREOF

(75) Inventor: Hirofumi Tsuruta, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 980 days.

(21) Appl. No.: 12/324,014

(22) Filed: Nov. 26, 2008

(65) Prior Publication Data

US 2009/0136126 A1 May 28, 2009

(30) Foreign Application Priority Data

Nov. 27, 2007 (JP) ................................. 2007-306307

(51) Int. Cl.
*G06K 9/00* (2006.01)

(52) U.S. Cl. ........ 382/162; 382/165; 382/170; 382/132; 382/199

(58) Field of Classification Search .................. 382/162, 382/165, 170, 132, 199, 305; 348/187, 453; 345/589, 590, 593, 597, 605

See application file for complete search history.

(56) References Cited

U.S. PATENT DOCUMENTS

2001/0048758 A1* 12/2001 Oosawa ......................... 382/132
2003/0053691 A1*  3/2003 Chamberlain ................ 382/170

* cited by examiner

*Primary Examiner* — Ali Bayat
(74) *Attorney, Agent, or Firm* — Carter, DeLuca, Farrell & Schmidt LLP

(57) ABSTRACT

Color processing is executed in consideration of a change in size of a region of interest in a moving image. To this end, a region of interest is set in each frame image of a moving image and an occupied area ratio indicating an amount that the region of interest occupies with respect to the entire frame image is calculated for each of the frame images set with the regions of interest. A temporal increase or decrease of the occupied area ratio is determined based on the occupied area ratios of a plurality of frame images set with the regions of interest, and a color processing method is set for each frame image based on the occupied area ratio and the temporal increase or decrease determination result. Color processing is applied to each frame image by the color processing method set for that frame image.

9 Claims, 11 Drawing Sheets

FIG. 5
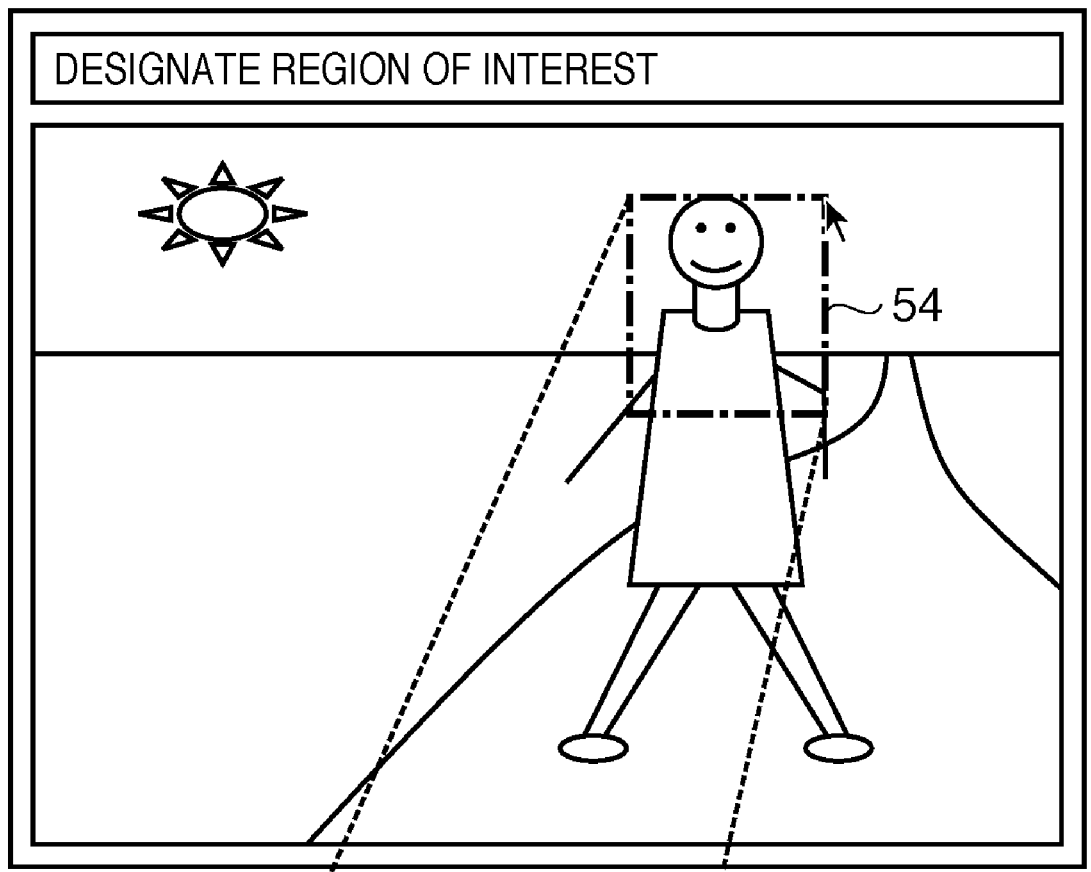
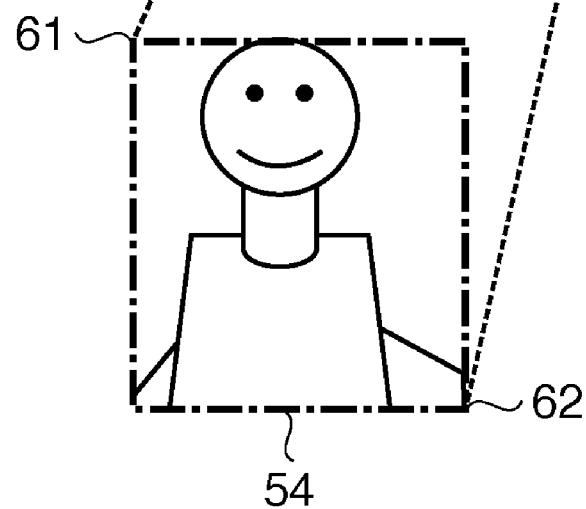

F I G. 7
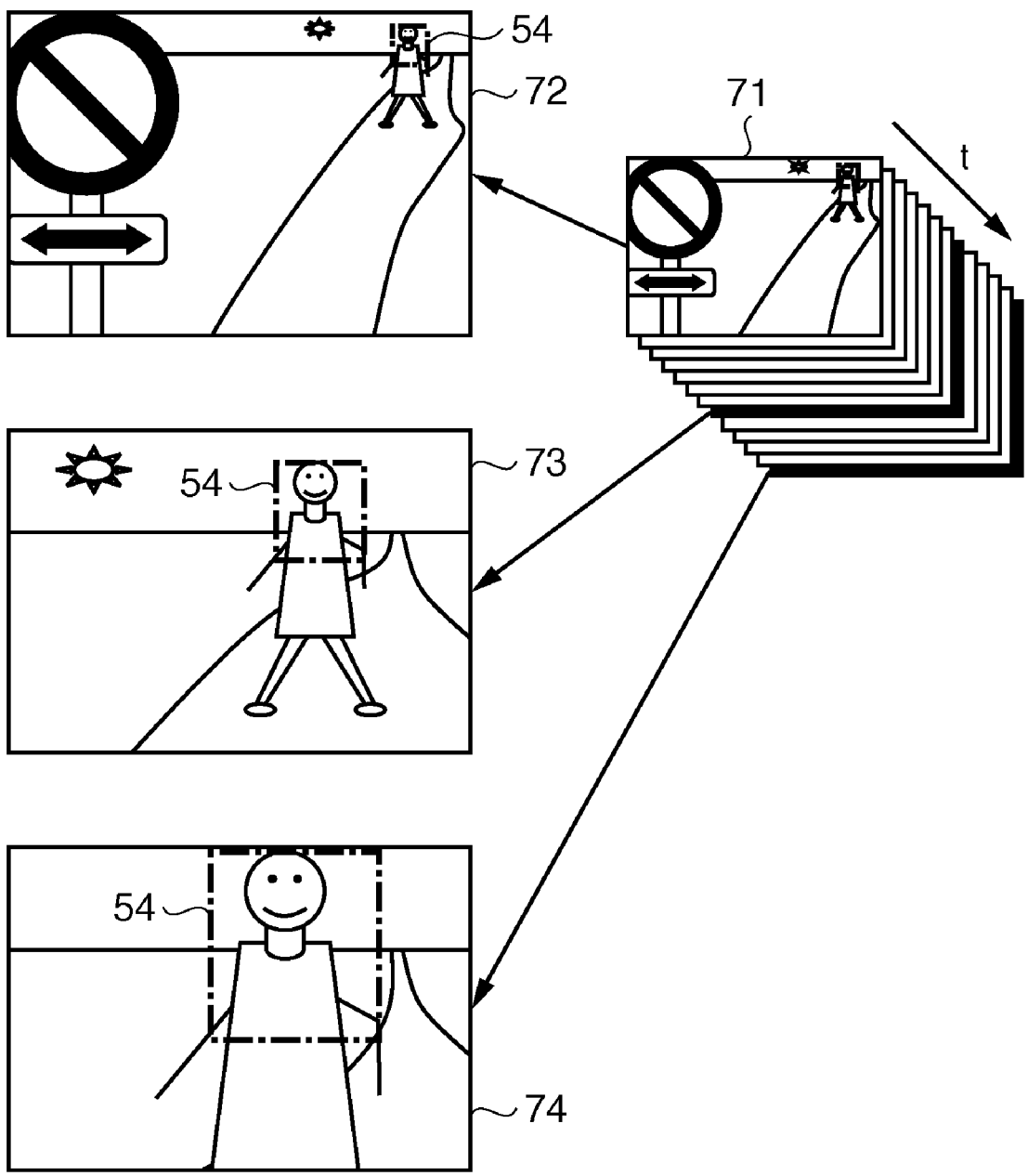

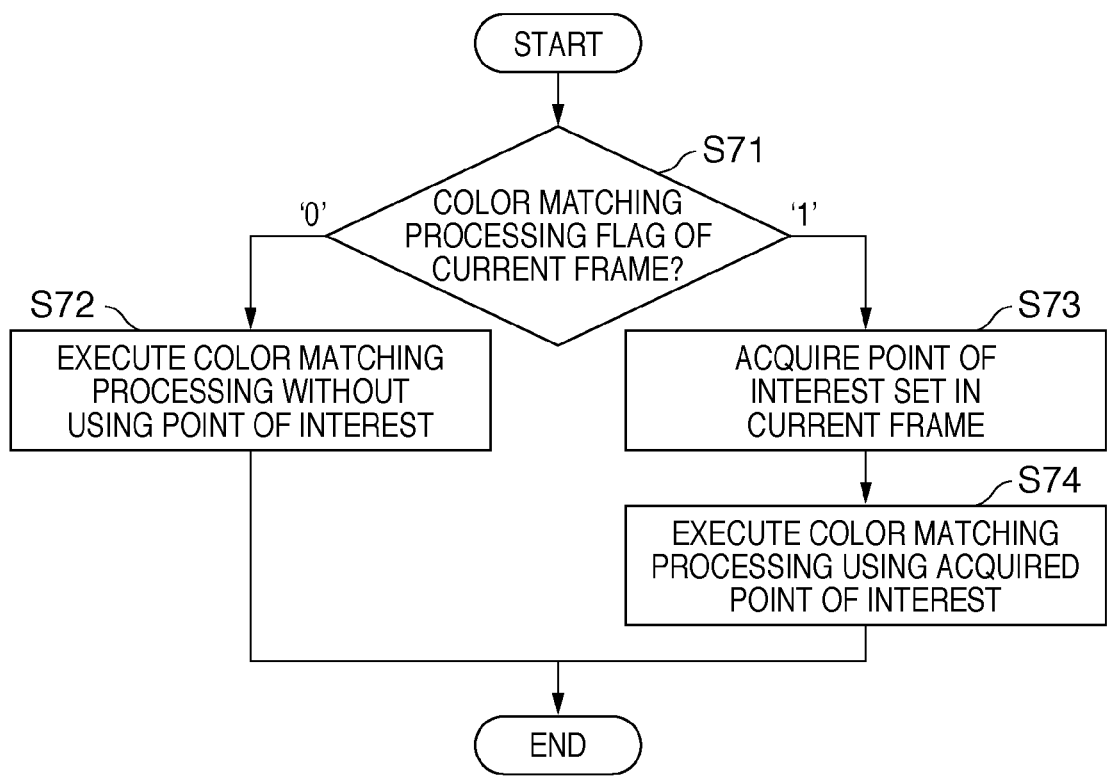

VIEWING ANGLE = 2°
VIEWING ANGLE OF BACKGROUND = 10°

COLOR PROCESSING APPARATUS AND METHOD THEREOF

BACKGROUND OF THE INVENTION

1. Field of the Invention

The present invention relates to color processing of moving image data.

2. Description of the Related Art

Various color perception models have been proposed to estimate human visions of colors. As a typical color perception model, a color appearance model (CAM) called CIECAM02 is known. In the CIECAM02, viewing environment parameters such as a white point, adaptation luminance, background luminance, viewing environment condition, and the like can be set. Upon application of color matching using the CIECAM02, these viewing environment parameters can be set respectively for viewing environments of the input and output sides, and color matching can be done in situations with different viewing environments of the input and output sides.

Also, an image appearance model (iCAM) in which the CAM incorporates the visual spatial characteristic has been proposed. The iCAM executes color matching not only for a still image but also for a moving image, and a visual temporal characteristic is also considered in estimation of appearance of colors of a moving image.

If a point of an image in which the user has an interest (point of interest) can be specified, the CIECAM02 can optimize the adaptation luminance in association with the point of interest. Likewise, in color matching using the iCAM, by optimizing the adaptation luminance in association with the point of interest, the color appearance characteristic can be improved, and color matching closer to human vision can be attained in compression processing of a high-dynamic range (HDR) image.

However, in a moving image, the size of an object corresponding to the point of interest changes due to movement of the object, zooming, and the like. Conventionally, the size of a size-changing object of which the viewer shows interest is not considered. As a result, color matching processing regardless of the point of interest is normally executed.

SUMMARY OF THE INVENTION

According to one aspect, a color processing method includes: setting a region of interest in a frame image of a moving image; calculating an occupied area ratio indicating an amount that the region of interest occupies with respect to the entire frame image in the frame image set with the region of interest; determining a temporal increase or decrease of the occupied area ratio based on the occupied area ratios of a plurality of frame images set with the regions of interest; setting a color processing method for each frame image based on the occupied area ratio and the temporal increase or decrease determination result; and applying color processing to the frame image based on the color processing method set in the frame image.

According to the aspect, color processing that considers a change in size of a region of interest in a moving image can be implemented.

Further features of the present invention will become apparent from the following description of exemplary embodiments with reference to the attached drawings.

BRIEF DESCRIPTION OF THE DRAWINGS

FIG. 5 illustrates an occupied area ratio;

FIG. 7 illustrates zoom-in/out operations;

FIG. 9 illustrates a table that describes selection thresholds of color matching processing;

FIG. 10 is a flowchart illustrating processing for each frame by a color processor.

DESCRIPTION OF THE EMBODIMENTS

Color processing according to embodiments of the present invention will be described in detail hereinafter with reference to the accompanying drawings.

[Arrangement]

Figure 1:
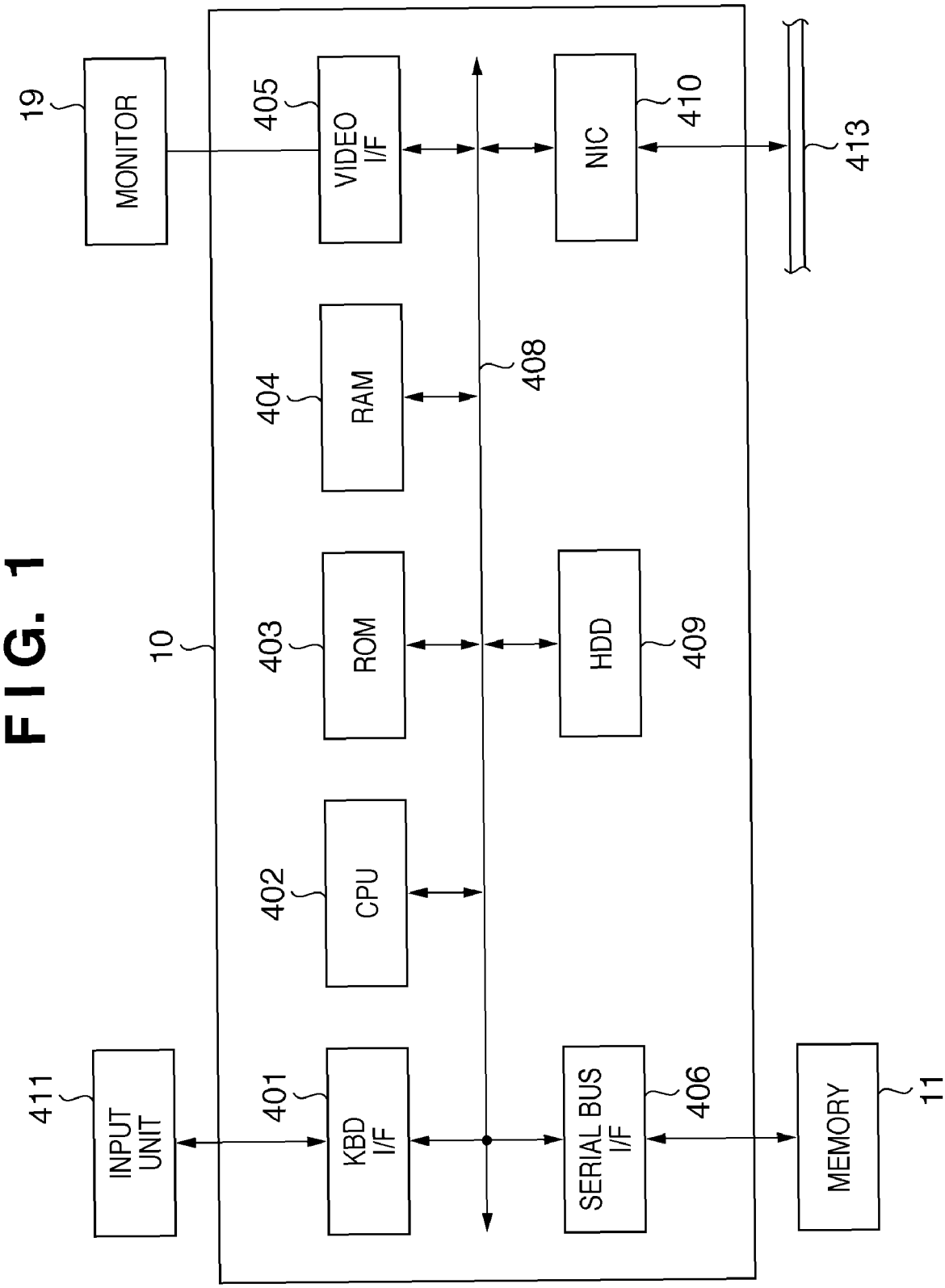
FIG. 1 is a block diagram showing the arrangement of an image processing apparatus which executes color processing.

FIG. 1 is a block diagram showing the arrangement of an image processing apparatus (color processing apparatus) 10 which executes color processing.

A microprocessor (CPU) 402 executes programs stored in a read-only memory (ROM) 403, hard disk drive (HDD) 409, and the like using a random-access memory (RAM) 404 as a work memory. The CPU 402 controls components to be described below via a system bus 408. Note that the HDD 409 also serves as an auxiliary storage when the storage capacity of the work memory runs short.

The CPU 402 displays a graphical user interface (GUI), an image of moving image data to be processed, an image of moving image data as a processing result, and the like on a monitor 19 via a video interface (I/F) 405. The monitor 19 is a display device such as a cathode ray tube (CRT), liquid crystal panel (LCD), projector, or the like, which is connected to (or built in) the image processing apparatus 10. The user inputs instructions and data by operating the GUI using an input unit 411 such as a keyboard, mouse, and the like connected to a keyboard interface (KBD I/F) 401. The CPU 402 acquires user's instructions and data input by the user via the KBD I/F 401.

A memory 11 connected to a serial bus I/F 406 for a serial bus such as USB (Universal Serial Bus), IEEE1394, or the like includes an HDD, a combination of a memory card and card reader, that of an optical disk and disk drive, and the like. The CPU 402 can load data such as moving image data and the like, and programs stored in the memory 11 into the RAM 404.

A network interface card (NIC) 410 is an interface with a network 413. The CPU 402 can exchange data with various devices connected to the network 413 via the NIC 410.

[Functional Arrangement]

Figure 2:
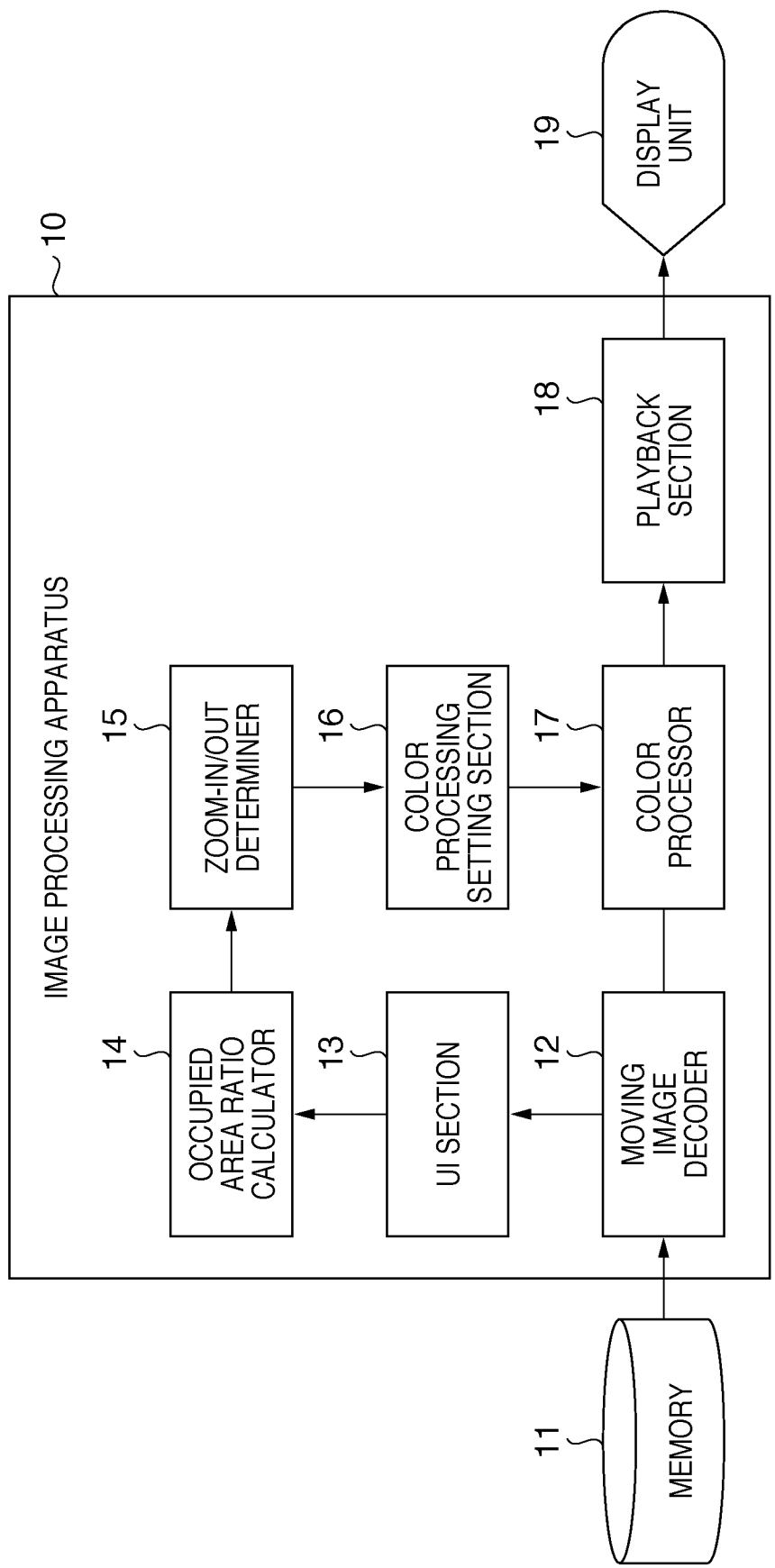
FIG. 2 is a block diagram showing the functional arrangement of an image processing apparatus upon execution of color processing of an embodiment.

FIG. 2 is a block diagram showing the functional arrangement of the image processing apparatus 10 upon execution of color processing of this embodiment. That is, application software (AP) that executes processing to be described later is supplied to the image processing apparatus 10 shown in FIG. 1, and the CPU 402 executes the AP, thus implementing the functional arrangement shown in FIG. 2.

The CPU 402 loads the AP from the HDD 409 or memory 11 into the RAM 404, and executes that AP. After that, the CPU 402 operates according to the AP. That is, the CPU 402 loads moving image data from the memory 11 into the RAM 404, applies appropriate color processing including color matching processing, and plays back a moving image using the monitor (display unit) 19. Note that the moving image data may be loaded from the HDD 409 or a server connected to the network 413.

A moving image decoder 12 decodes object code into object images when the moving image data loaded into the RAM 404 is recorded by an object encoding method such as MPEG4 or the like. Then, the moving image decoder 12 decodes moving image data into a set of still image data for one frame (to be referred to as a frame image hereinafter). Note that the format of still image data is not particularly limited. For example, TIFF, JPEG, and the like may be used as the format of still image data. Also, the processes from a user interface (UI) section 13 to a playback section 18 shown in FIG. 2 are applied to a frame image.

The UI section 13 provides a GUI that allows the user to designate a region of interest including an object of interest, as will be described in detail later. Note that the GUI is displayed on the monitor 19, and user's instructions (designation of a region of interest, and the like) are input via the input unit 411.

An occupied area ratio calculator 14 calculates a ratio indicating the size (area) that the region of interest occupies with respect to the entire image as an occupied area ratio, as will be described in detail later.

A zoom-in/out determiner 15 compares the occupied area ratio of the region of interest of a frame to be processed (to be referred to as a current frame hereinafter) and that of the region of interest of a frame temporally behind the current frame (to be referred to as a forward frame hereinafter), as will be described in detail later. That is, the zoom-in/out determiner 15 determines based on a change in occupied area ratio of the regions of interest in the plurality of frames if the size of the region of interest temporally enlarges (zooms in) or reduces (zooms out), or the size remains the same. In the following description, determination of a temporal increase or decrease in occupied area ratio, in other words, determination associated with transition of the size of the region of interest will be referred to as "zoom-in/out determination".

A color processing setting section 16 determines based on the occupied area ratio of the region of interest of the current frame and the zoom-in/out determination result whether or not a point of interest (to be described later) is used in color matching processing, as will be described in detail later.

A color processor 17 applies, to a frame image, color conversion processing based on the CIECAM02, iCAM, or the like, which matches a user's viewing environment and the reproduction characteristics of the display, as will be described in detail later. The color processor 17 can execute color processing including color matching processing that uses the point of interest set by the color processing setting section 16, and that including color matching processing, does not use any point of interest.

The playback section 18 displays the frame image processed by the color processor 17 on a video window included in the GUI as a moving image in accordance with the frame rate of the moving image data input from the moving image decoder 12. Alternatively, the moving image may be displayed on a window independent from the GUI. Instead of playback display of the moving image, the moving image may be stored as object-encoded moving image data, i.e., encoded moving image data that has undergone the color matching processing, in the memory 11 or a server connected to the network 413. In this case, the user decodes and plays back the encoded moving image data that has undergone the color matching processing using a moving image player of a personal computer (PC) or a moving image playback device independent from the PC, which is prepared separately, thus watching a moving image.

Moving Image Decoder

The moving image decoder 12 generates a frame image from moving image data in accordance with the frame rate upon recording the input moving image data, and stores the frame image in a predetermined area on the RAM 404. The moving image decoder 12 creates a frame information table that records information of the frame image on a predetermined area of the RAM 404 upon decoding the moving image data.

Figure 3:
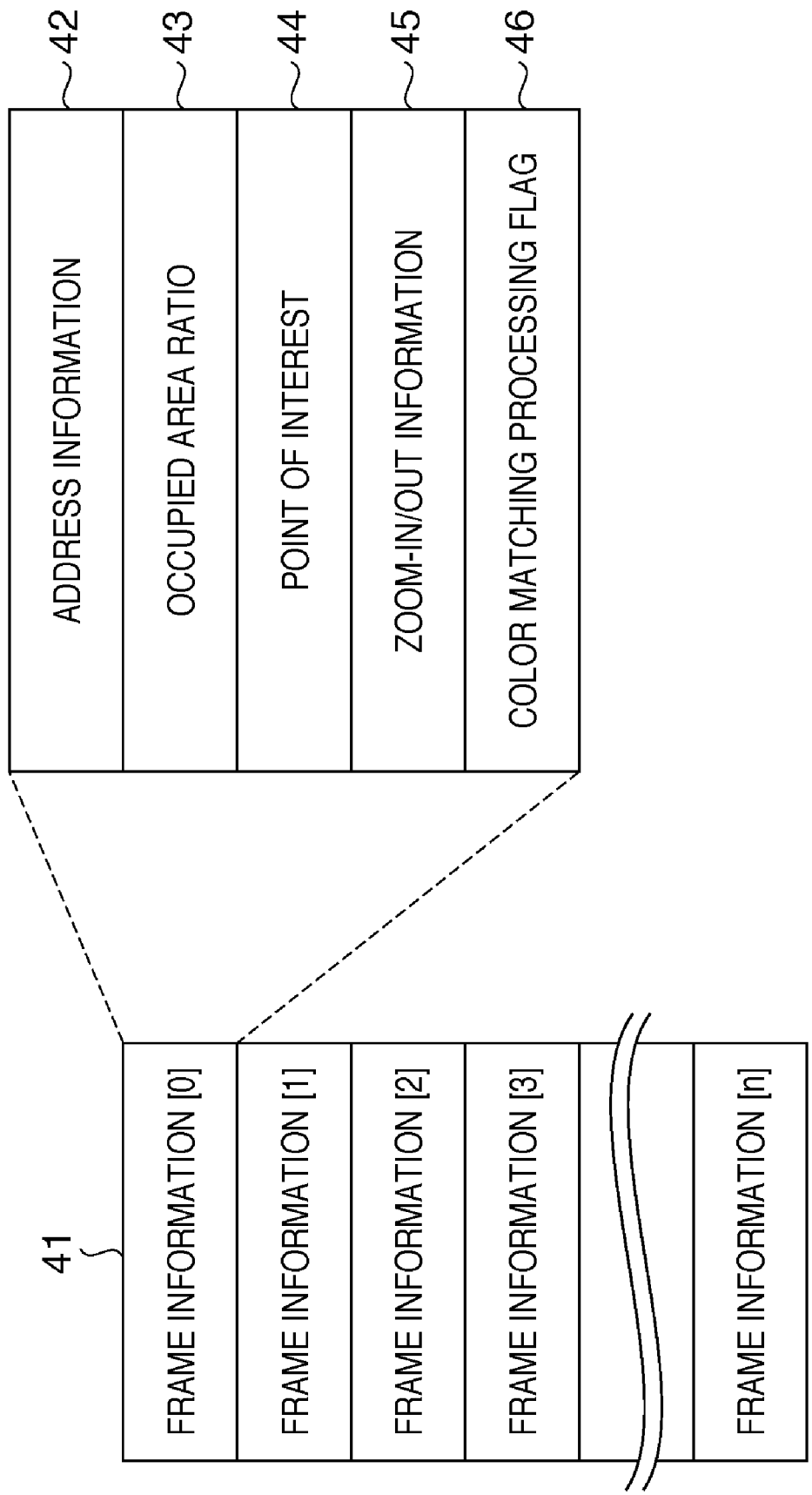
FIG. 3 illustrates a frame information table that records information of a frame image.

FIG. 3 illustrates a frame information table 41 that records information of the frame image.

The frame information table 41 records address information 42, which indicates the address of the RAM 404 where a frame image is stored, for each frame. Note that the recording order in this frame information table 41 is a time-series order, and information of a start frame is recorded at the start position of the frame information table 41.

UI Section

Figure 4:
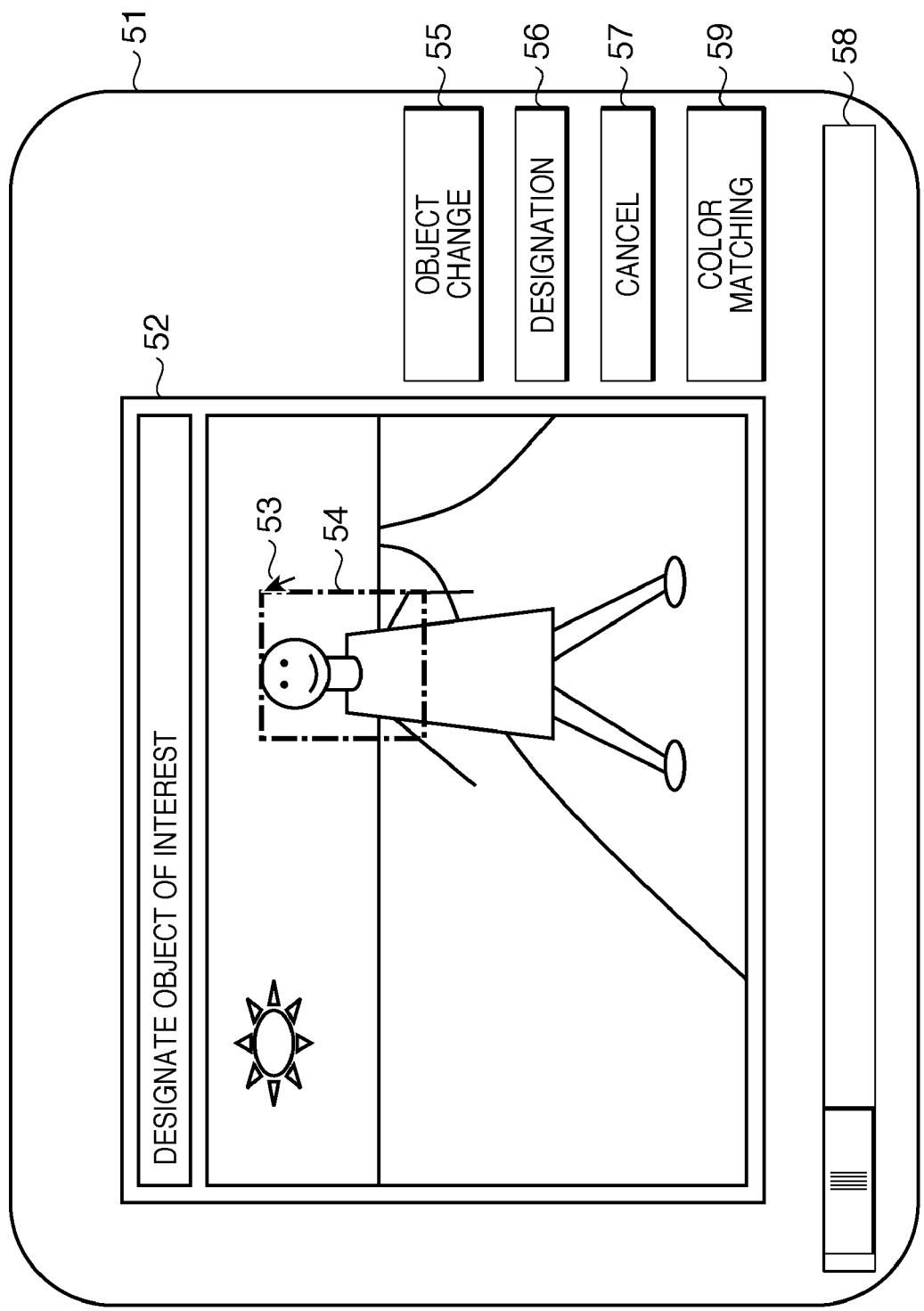
FIG. 4 illustrates an example of a GUI provided by a UI section.

FIG. 4 illustrates an example of a GUI 51 provided by the UI section 13.

The UI section 13 displays a frame image of the moving image data to be processed on a preview window 52 of the GUI 51, and accepts a user's designation of a region of interest including an object of interest, and the like.

The user displays a frame image including an object of interest on the preview window 52 using a slider bar 58 by operating the input unit 411. Then, the user moves a mouse cursor 53 and designates a range of a region of interest including the object of interest. In response to this operation, the UI section 13 displays a rectangle indicating a region 54 of interest. Upon completion of designation of the region 54 of interest, the user clicks a designation button 56 to designate the region 54 of interest. When the user wants to cancel designation of the region 54 of interest (to clear the rectangle), he or she presses a cancel button 57.

Next, the user displays the next frame image, a region of interest of which is to be designated, on the preview window 52 using the slider bar 58, and designates a region 54 of interest. Note that it is desirable that the frame interval upon designating the regions 54 of interest is dense. However, as will be described later, since movement of the regions 54 of interest is to be estimated, the frame interval may be several seconds.

In the example of FIG. 4, the user designates a person image from the head to the chest as the region 54 of interest. However, the user may want to change the region of interest to that including another object in the middle of the moving image. In this case, the user displays a frame image including a new object of interest on the preview window 52 using the slider bar 58, presses an object change button 55, and then designates a region 54 of interest.

When the user presses the designation button 56 for the first time with respect to the moving image to be processed, the UI section 13 sets "1" in zoom-in/out information 45 in the frame information table 41, which corresponds to that frame, so as to indicate the existence of a new region 54 of interest. When the user presses the object change button 55 and then presses the designation button 56, the UI section 13 sets "1" in the zoom-in/out information 45 of that frame, so as to indicate the existence of a new region of interest. When the user presses the designation button 56 in another situation, the UI section 13 sets "2" in the zoom-in/out information 45 of that frame so as to indicate the existence of a region of interest. Note that an initial value of the zoom-in/out information 45 is "0". The zoom-in/out information 45 is 3-bit data, as will be described later.

Upon pressing of a color matching button 59, the UI section 13 instructs the sections from the zoom-in/out determiner 15 to the playback section 18 to start processing.

Occupied Area Ratio Calculator

The occupied area ratio calculator 14 calculates an occupied area ratio indicating an amount that the area of the region 54 of interest, which is acquired by the UI section 13, occupies with respect to the entire image. The occupied area ratio calculator 14 records the calculated occupied area ratio in the frame information table 41 as an occupied area ratio 43 of that frame. As shown in FIG. 5, the occupied area ratio calculator 14 calculates an area So of the region 54 of interest based on the coordinate values of an upper left position 61 and lower right position 62 of the region 54 of interest, and then calculates So/Sw as an occupied area ratio (where Sw is the image size (e.g., X×Y pixels) of the moving image).

Furthermore, the occupied area ratio calculator 14 calculates the central coordinate value (central point) of the region 54 of interest based on the coordinate values of the upper left position 61 and lower right position 62 of the region 54 of interest. Then, the occupied area ratio calculator 14 records the calculated central coordinate value (central point) in the frame information table 41 as a point 44 of interest of that frame. Note that the point of interest is not limited to the central point of the region 54 of interest, but it may be set near the center of a face image included in the region 54 of interest using a technique such as face detection or the like. Alternatively, the point of interest may be set at an arbitrary position in the region 54 of interest.

Zoom-in/Out Determiner

Upon reception of the processing start instruction from the UI section 13, the zoom-in/out determiner 15 executes zoom-in/out determination based on the occupied area ratio 43.

Figure 6:
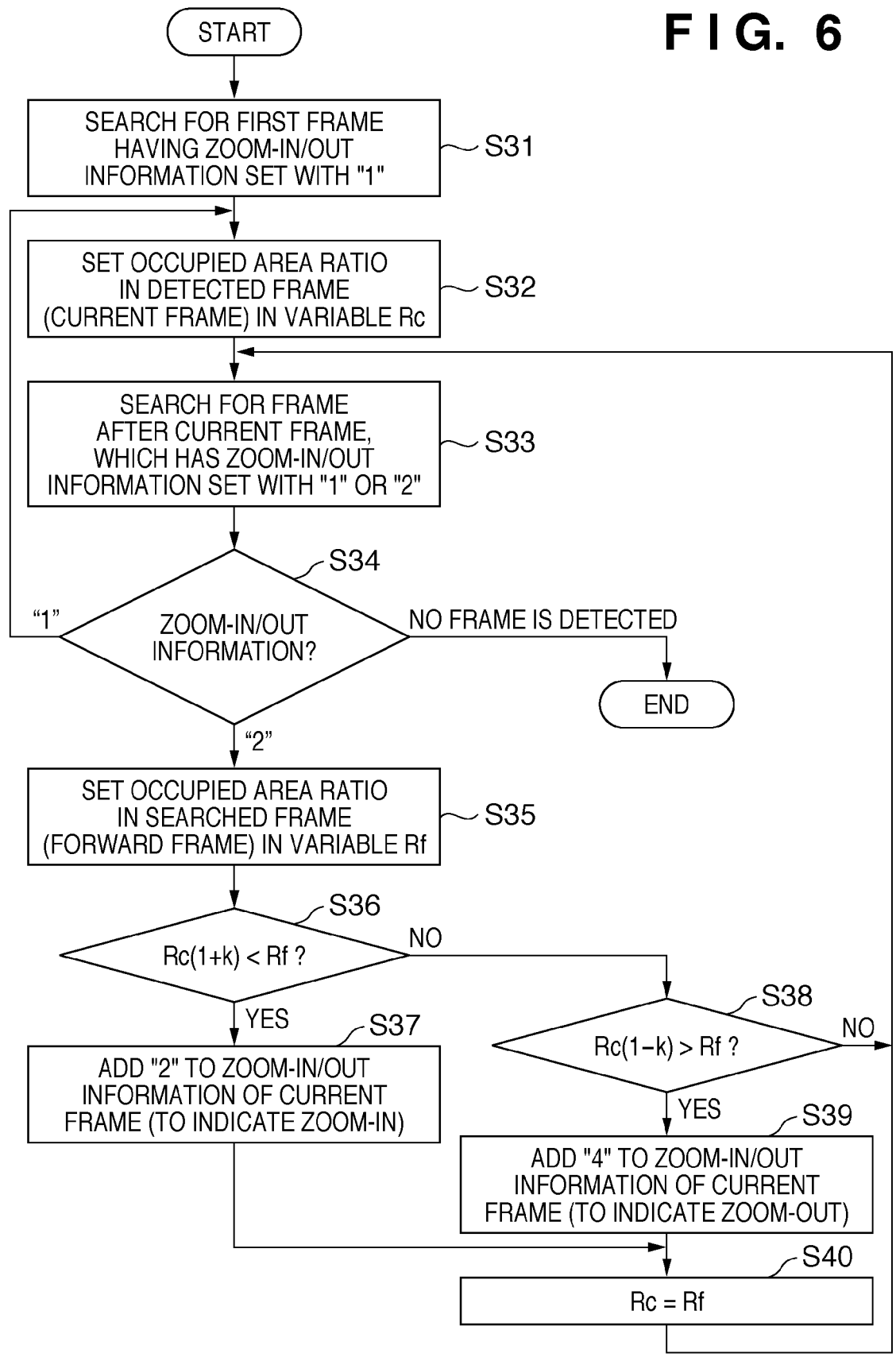
FIG. 6 is a flowchart illustrating zoom-in/out determination.

FIG. 6 is a flowchart illustrating zoom-in/out determination.

The zoom-in/out determiner 15 searches the frame information table 41 from its start position for a first frame set with "1" in the zoom-in/out information 45 (S31). The zoom-in/out determiner 15 selects the detected frame as the current frame, and sets the occupied area ratio 43 in the current frame in a variable Rc (S32).

Next, the zoom-in/out determiner 15 searches the frame information table 41 after the current frame for a frame set with "1" or "2" in the zoom-in/out information 45 (S33). If a frame set with "1" in the zoom-in/out information 45 is detected (S34), the process returns to step S32. If a frame set with "2" in the zoom-in/out information 45 is detected (S34), the process advances to step S35. If the final frame is reached without detecting any frame set with "1" or "2" in the zoom-in/out information 45, the processing ends.

Upon detection of a frame set with "2" in the zoom-in/out information 45, the zoom-in/out determiner 15 selects that frame as a forward frame, and sets the occupied area ratio 43 in the forward frame in a variable Rf (S35). The zoom-in/out determiner 15 determines based on the following inequality if the occupied area ratio in the forward frame increases compared to that in the current frame (S36).

$$Rc \times (1+k) < Rf \qquad (1)$$

where Rc is the occupied area ratio in the current frame,
Rf is the occupied area ratio in the forward frame, and
k is an arbitrary coefficient (e.g., 0.05).

The coefficient k in inequality (1) is set to prevent a malfunction when the occupied area ratios 43 in the current frame and forward frame have almost no change.

If the occupied area ratio Rf in the forward frame increases (inequality (1) is true), the zoom-in/out determiner 15 adds "2" to the zoom-in/out information 45 of the current frame (to indicate zoom-in) (S37), and the process advances to step S40. If inequality (1) is false, the zoom-in/out information 45 determines based on the following inequality if the occupied area ratio in the forward frame decreases compared to that in the current frame (S38).

$$Rc \times (1-k) > Rf \qquad (2)$$

If the occupied area ratio Rf in the forward frame decreases (inequality (2) is true), the zoom-in/out determiner 15 adds "4" to the zoom-in/out information 45 corresponding to the current frame (to indicate zoom-out) (S39), and the process advances to step S40. If inequality (2) is false, the zoom-in/out determiner 15 does not change the zoom-in/out information 45 of the current frame (to indicate none of zoom-in/out), and the process returns to step S33.

In step 40, the zoom-in/out determiner 15 sets the value of the variable Rf in the variable Rc, and the process returns to step S33.

In this way, the zoom-in/out determiner 15 updates the zoom-in/out information 45 of a frame image set with "1" or "2" in the zoom-in/out information 45.

FIG. 7 illustrates zoom-in/out operations. In FIG. 7, in a set 71 of frame images, frame images 72, 73, and 74 are those set with "1" or "2" in their zoom-in/out information 45. Since the occupied area ratio of the frame image 73 increases with respect to that of the frame image 72, "2" is added to the zoom-in/out information 45 of the frame image 72 to set "3" or "4". Likewise, since the occupied area ratio of the frame image 74 increases with respect to that of the frame image 73, "2" is added to the zoom-in/out information 45 of the frame image 73 to set "3" or "4". Information represented by the zoom-in/out information 45 after the zoom-in/out determination is as follows.

| Value | Frame | Zoom-in/out |
|---|---|---|
| 0 | Not set (initial value) | |
| 1 | New region of interest is set | No size change |
| 2 | Region of interest is set | No size change |
| 3 | New region of interest is set | Zoom-in |
| 4 | Region of interest is set | Zoom-in |
| 5 | New region of interest is set | Zoom-out |
| 6 | Region of interest is set | Zoom-out |
| 7 | Not defined (unset) | |

Color Processing Setting Section

Figure 8A:
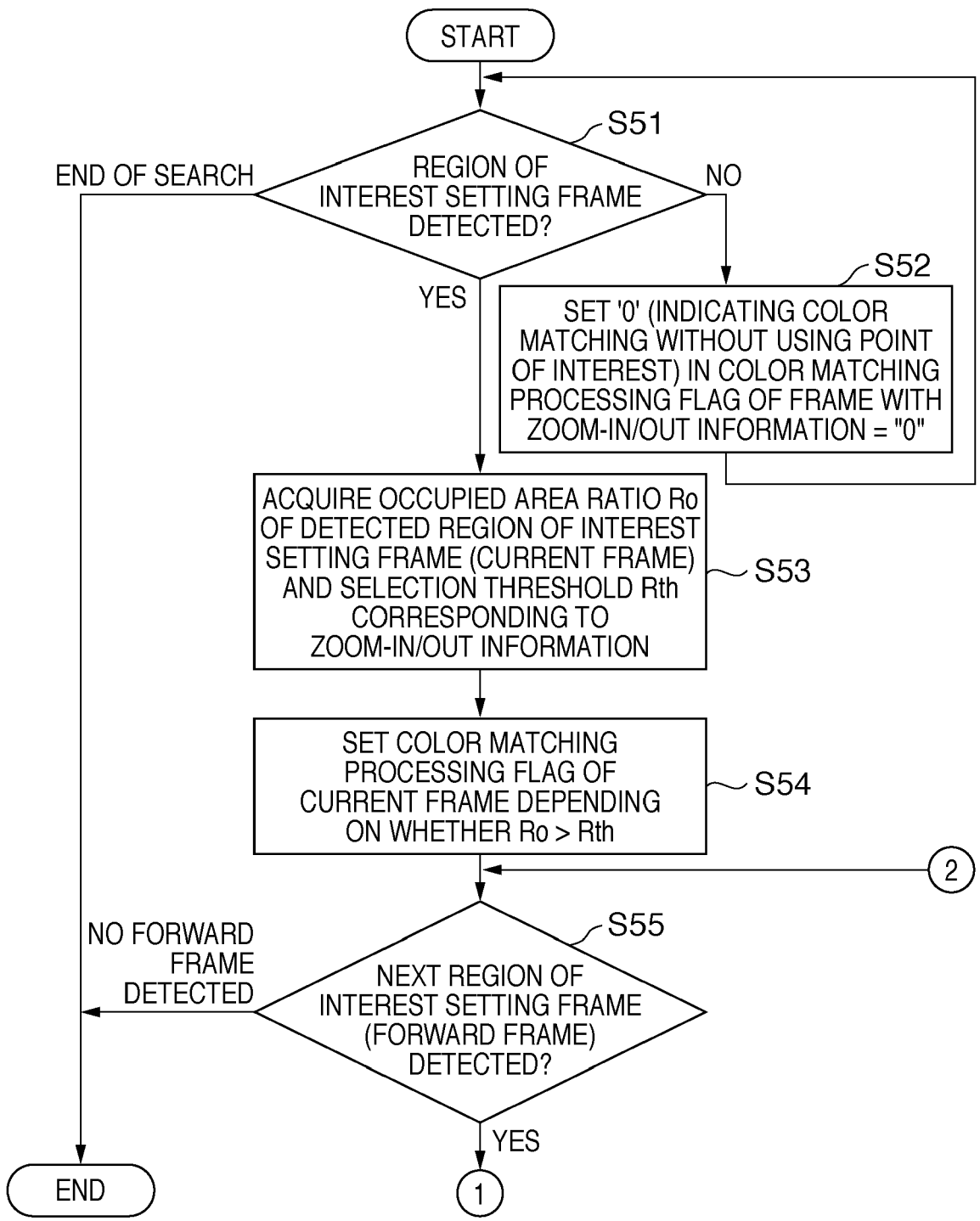
FIGS. 8A and 8B are a flowchart illustrating processing of a color matching processor.
Figure 8B:
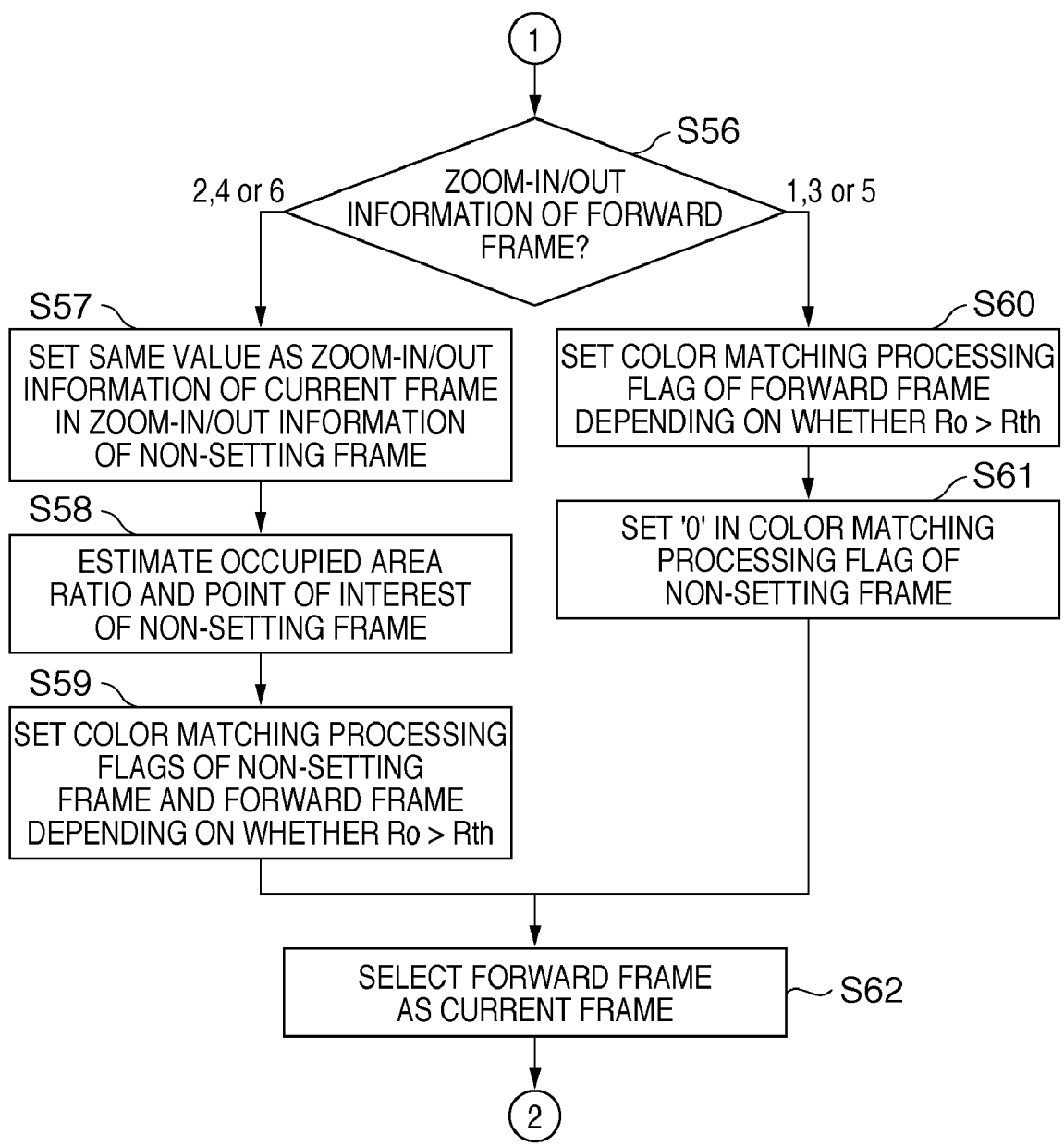

FIGS. 8A and 8B are a flowchart illustrating the processing of the color processing setting section 16.

The color processing setting section 16 searches the frame information table 41 from its start position for a frame set with a value other than "0" (not set) in its zoom-in/out information 45 (to be referred to as a region of interest setting frame hereinafter) (S51). The color processing setting section 16 sets '0' (to indicate color matching without using any point of interest) in a color matching processing flag 46 of the frame information table 41, which corresponds to a frame in which the zoom-in/out information 45 is not set (S52), and continues the search (S51). If the final frame is reached without detecting any region of interest setting frame, the processing ends.

FIG. 9 shows an example of a table that describes selection thresholds of the color matching processing.

Upon detection of the region of interest setting frame, the color processing setting section 16 acquires an occupied area ratio Ro set in that frame (to be referred to as a current frame hereinafter), and a selection threshold Rth corresponding to the zoom-in/out information from the table shown in FIG. 9 (S53).

FIG. 9 shows selection thresholds for "zoom-in" and "zoom-out". If the zoom-in/out information indicates "no size change", the same selection threshold as that of the immediately preceding region of interest setting frame is used. If the current frame is the first region of interest setting frame, there is no immediately preceding region of interest setting frame, and the zoom-in/out information indicates "no size change", for example, a selection threshold for "zoom-in" is used.

The color processing setting section 16 compares the occupied area ratio Ro of the current frame with the selection threshold Rth. If Ro>Rth, the color processing setting section 16 sets '1' (to indicate color matching using a point of interest) in the color matching processing flag 46. If R0≦Rth, the color processing setting section 16 sets '0' in the color matching processing flag 46 (S54). The color processing setting section 16 searches the frame information table 41 after the current frame for the next region of interest setting frame (to be referred to as a forward frame hereinafter) (S55). If the final frame is reached without detecting any forward frame, the processing ends.

If a forward frame corresponding to the zoom-in/out information 45="2", "4", or "6" is detected (S55, S56), the color processing setting section 16 sets the same value as the zoom-in/out information of the current frame in the zoom-in/out information 45 of each non-setting frame (S57). Note that the non-setting frame means each of frames from the frame next to the current frame to a frame before the forward frame, in which the zoom-in/out information 45 is not set. The color processing setting section 16 estimates the occupied area ratio and point of interest of each non-setting frame, and sets the estimated occupied area ratio and point of interest in the occupied area ratio 43 and point 44 of interest of that frame (S58).

The occupied area ratio is estimated in such a manner that, for example, the range from the occupied area ratio of the current frame to that of the forward frame is equally divided into the number of non-setting frames+1, and the value of each divided point is set as an occupied area ratio. The point of interest is estimated in such a manner that, for example, a line segment which couples the point of interest of the current frame to that of the forward frame on the screen is equally divided into the number of non-setting frames+1, and each divided point is set as a point of interest.

The color processing setting section 16 sets the color matching processing flags 46 of the non-setting frames and the forward frame in the same sequence as in steps S53 and S54 (S59).

If a forward frame corresponding to the zoom-in/out information 45="1", "3", or "5" is detected (S55, S56), the color processing setting section 16 sets the color matching processing flag 46 of the forward frame in the same sequence as described above (S60). Since the region of interest is changed, the color processing setting section 16 sets '0' in the color matching processing flag 46 of each non-setting frame (S61).

Next, the color processing setting section 16 selects the forward frame as the current frame (S62), and the process returns to step S55.

With the above-described processing, information required for color matching processing of the frames set with the regions of interest and frames between these frames can be set. Note that color matching processing without using any point of interest is set for frames before the region of interest is set, during a change of the region of interest, and after completion of the setting of the region of interest (from the last region of interest setting frame to the final frame).

Note that FIG. 9 shows three types of selection thresholds for each of "zoom-in" and "zoom-out". When the user designates a category of the region of interest using a GUI (not shown), a selection threshold corresponding to the category such as "person (whole body)", "person (face)", or the like is used. When no category is particularly designated, a general-purpose value may be used.

Color Processor

FIG. 10 is a flowchart illustrating processing for each frame by the color processor 17.

The color processor 17 executes color matching processing for each frame with reference to the frame information table 41. The color processor 17 checks the color matching processing flag 46 of the current frame (S71). If the flag is '0', the color processor 17 applies color matching processing without using any point of interest to the frame image of the current frame (S72). If the color matching processing flag 46 is '1', the color processor 17 acquires the point of interest set in the current frame so as to apply color matching processing using a point of interest (S73), and applies the color matching processing using the acquired point of interest to the frame image of the current frame (S74).

Figure 11:
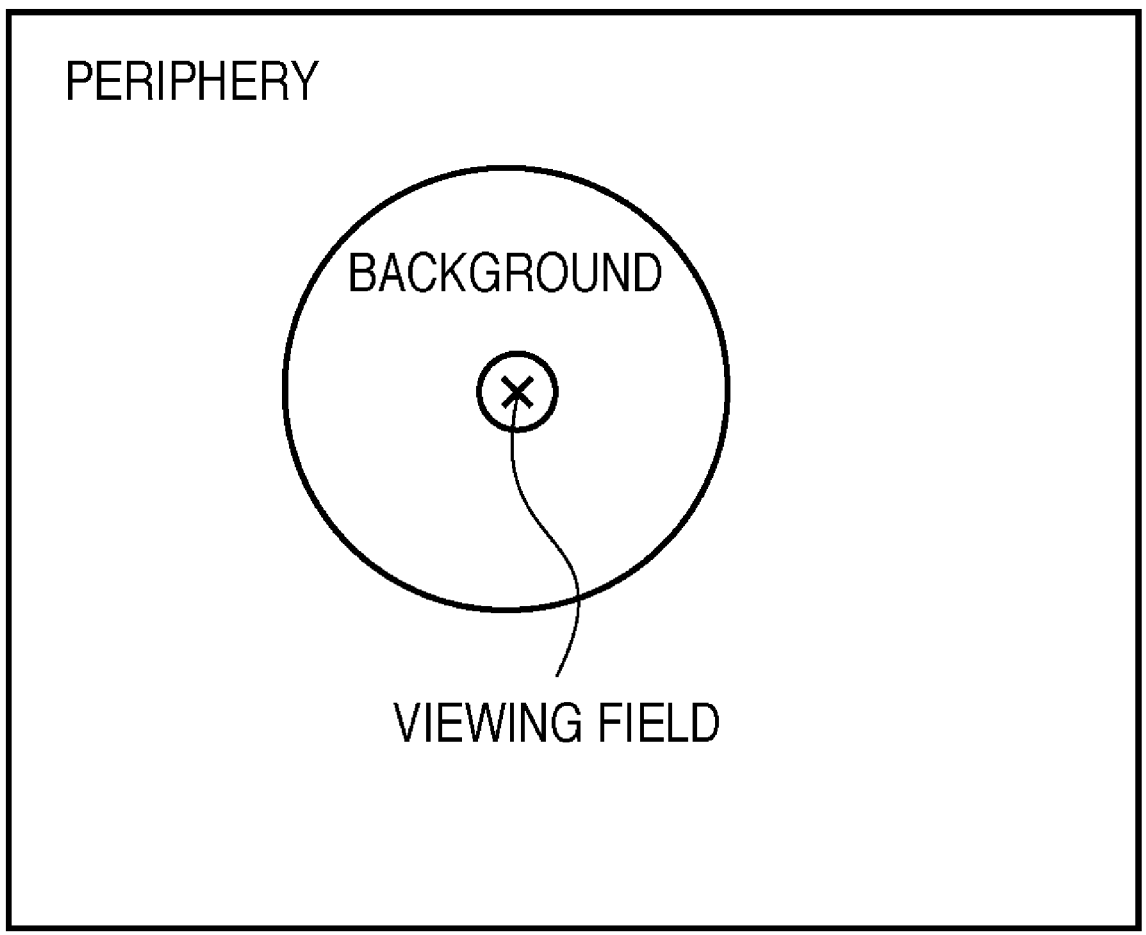
FIG. 11 illustrates a point of interest.

FIG. 11 illustrates a point of interest, as in the regulation of the CIECAM02. A circle is drawn to have a point of interest (X mark) as the center, and a circular region having a viewing angle of 10° is referred to as a background. In color appearance processing, as a part of color matching processing, the luminance of the background is used as a background luminance (color matching processing using a point of interest). On the other hand, when no background luminance is obtained, a 20% value of a white luminance value is set as a general-purpose value in the background luminance (color matching processing without using any point of interest).

Upon calculation of environment coefficients of a periphery in the iCAM, a region having a viewing angle of 10° or equivalent around the point of interest is extracted, and a low-pass filter process is undergone for a luminance, thus calculating a background luminance used in color appearance processing. This region to be extracted may be set as a region of interest. In this case, a value indicating the coordinates of the region of interest is recorded in the frame information table 41, and the region of interest of each non-setting frame is estimated. This background luminance in the iCAM can be used as processing optimized for an object of interest upon execution of color matching processing by lowering the resolution of an HDR image, in addition to the color matching processing.

As described above, more satisfactory color matching can be provided to the user using a point of interest in a scene including the point of interest. By matching the switching timing to processing including no point of interest with the motion of the eyes of a viewer, color matching processing optimal to viewing of a moving image can be provided.

The present invention can be applied to a system including a plurality of devices (e.g., host computer, interface, reader, printer) or to an apparatus having a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, an OS (operating system) or the like working on a computer can perform a part or the entire processes in accordance with designations of the program code to realize functions according to the above embodiments.

Furthermore, after the program code is read from the storage medium, it can be written in a function expansion card which is inserted into the computer or in a memory provided in a function expansion unit which is connected to the computer, CPU or the like contained in the function expansion card or unit which performs a part or the entire process in accordance with designations of the program code to realize functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-306307, filed Nov. 27, 2007, which is hereby incorporated by reference herein in its entirety.

What is claimed is:

1. A color processing apparatus comprising:
a first setting section, arranged to set a region of interest in a frame image of a moving image;
a calculator, arranged to calculate an occupied area ratio indicating an amount the region of interest occupies with respect to the entire frame image in the frame image set with the region of interest;
a determiner, arranged to determine a temporal increase or decrease of the occupied area ratio based on the occupied area ratios of a plurality of frame images set with the regions of interest;
a second setting section, arranged to set a color processing method for each frame image based on the occupied area ratio and the temporal increase or decrease determined by the determiner; and
a color processor, arranged to apply color processing to the frame image based on the color processing method set in the frame image.

2. The color processing apparatus according to claim 1, wherein the second setting section sets a first color processing method that applies color appearance processing according to the region of interest, or a second color processing method that applies color appearance processing according to the entire frame image.

3. The color processing apparatus according to claim 2, wherein the color processor applies color appearance processing having a central point of the region of interest as a center of a viewing field to the frame image set with the first color processing method.

4. The color processing apparatus according to claim 2, wherein the color processor applies color appearance processing using a background luminance calculated from the region of interest to the frame image set with the first color processing method.

5. The color processing apparatus according to claim 1, wherein the second setting section sets the color processing method based on a threshold corresponding to the temporal increase or decrease determined by the determiner and a comparison result of the occupied area ratios.

6. The color processing apparatus according to claim 1, further comprising an estimator arranged to estimate occupied area ratios of frame images which exist between a plurality of images set with the regions of interest based on the occupied area ratios of the plurality of frame images.

7. The color processing apparatus according to claim 1, further comprising an estimator arranged to estimate regions of interest of frame images which exist between a plurality of images set with the regions of interest, based on the regions of interest of the plurality of frame images.

8. An image processing method comprising:
setting a region of interest in a frame image of a moving image;
calculating an occupied area ratio indicating an amount that the region of interest occupies with respect to the entire frame image in the frame image set with the region of interest;
determining a temporal increase or decrease of the occupied area ratio based on the occupied area ratios of a plurality of frame images set with the regions of interest;
setting a color processing method for each frame image based on the occupied area ratio and the temporal increase or decrease determination result; and
applying color processing to the frame image based on the color processing method set in the frame image.

9. A non-transitory computer-readable storage medium storing a computer-executable program for causing a computer to perform an image processing method, the image processing method comprising:
setting a region of interest in a frame image of a moving image;
calculating an occupied area ratio indicating an amount that the region of interest occupies with respect to the entire frame image in the frame image set with the region of interest;
determining a temporal increase or decrease of the occupied area ratio based on the occupied area ratios of a plurality of frame images set with the regions of interest;
setting a color processing method for each frame image based on the occupied area ratio and the temporal increase or decrease determination result; and
applying color processing to the frame image based on the color processing method set in the frame image.

* * * * *